(12) United States Patent
Kim et al.

(10) Patent No.: US 7,696,278 B2
(45) Date of Patent: Apr. 13, 2010

(54) ACRYLIC PRESSURE SENSITIVE ADHESIVE COMPOSITIONS

(75) Inventors: Se Ra Kim, Daejeon (KR); In Cheon Han, Seoul (KR); Sang Ki Chun, Daejeon (KR); Suk Ky Chang, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/447,143

(22) Filed: Jun. 6, 2006

(65) Prior Publication Data

US 2006/0279923 A1    Dec. 14, 2006

(30) Foreign Application Priority Data

Jun. 10, 2005    (KR)    ...................... 10-2005-0049811

(51) Int. Cl.
| | |
|---|---|
| C08K 3/10 | (2006.01) |
| C08K 3/16 | (2006.01) |
| C08K 3/30 | (2006.01) |
| C08K 5/10 | (2006.01) |
| C08K 5/00 | (2006.01) |
| C08L 31/02 | (2006.01) |
| C08L 3/00 | (2006.01) |
| C08L 33/06 | (2006.01) |

(52) U.S. Cl. .................... 524/556; 524/401; 524/81; 524/284; 524/560

(58) Field of Classification Search ................ 524/556, 524/560, 401, 81, 284

See application file for complete search history.

(56) References Cited

U.S. PATENT DOCUMENTS 4,340,524 A * 7/1982 Bullman ..................... 524/297
5,508,107 A * 4/1996 Gutman et al. .............. 428/339

FOREIGN PATENT DOCUMENTS

| JP | 05140519 | | 8/1993 |
| JP | 06128539 | | 5/1994 |
| JP | 06128539 | A * | 5/1994 |

OTHER PUBLICATIONS

English Translation of JP 06128539 A; Kuroya; May 10, 1994.*

* cited by examiner

*Primary Examiner*—Vasu Jagannathan
*Assistant Examiner*—Karuna P Reddy
(74) *Attorney, Agent, or Firm*—McKenna Long & Aldridge LLP

(57) ABSTRACT

The present invention relates to an acrylic pressure sensitive adhesive composition, specifically, an acrylic pressure sensitive adhesive composition having improved anti-static properties, comprising 100 part by weight of acrylic copolymers, 0.01 to 20 part by weight of ester plasticizer having at least one ether linkage in the molecular structure, and 0.001 to 25 part by weight of metal salts consisting of alkali metal cation, and anion which is counter-ion of super strong acid and has perfluoro alkyl group, and prevent whitening of appearance under high temperature and humidity condition as well as static electricity without change of the durability, transparency, and adhesion.

15 Claims, No Drawings

ACRYLIC PRESSURE SENSITIVE ADHESIVE COMPOSITIONS

This application claims the benefit of Korean Patent Application No. 10-2005-0049811 filed Jun. 10, 2006 in Korea, which is hereby incorporated by reference in its entirety.

TECHNICAL FIELD

The present invention relates to an acrylic pressure sensitive adhesive composition. Specifically, the present invention relates to an acrylic pressure sensitive adhesive composition having improved anti-static property which can prevent static electricity enough without change of the durability, and has transparent without whitening appearance under high temperature and humidity.

BACKGROUND ART

In information industry, electrostatics has been a troublesome problem in the production of numbers of electronic components. Electrostatics, generated during the production process of electronic products, may draw dust or other pollutants that might damage the properties of the products. Also, modern electric devices are highly sensitive to electrostatics, so that temporary or permanent damage of such devices by electrostatics has been increasingly reported.

Nowadays, liquid crystal display (LCD) is widely used in various fields producing notebook computer, monitor, TV, etc, due to its potential for weight reduction and slimness.

In general, LCD consists of liquid crystal cell containing liquefied crystal therein, polarizer, and pressure sensitive adhesive layer for the adhesion of the above liquid crystal and the polarizer. The polarizer consists of multilayer including a row of iodine compounds or dichroic polarizing material, protective film, such as triacetyl cellulose (TAC), to protect polarizing element, pressure sensitive adhesive layer, and releasing film, etc.

Particularly, the production of LCD includes the process of adhering polarizer, during which static electricity is generated after peeling releasing film out of pressure sensitive adhesive layer. The generated static electricity affects orientation of liquid crystal in LCD, resulting in defectives.

In order to prevent generation of static electricity as explained above, a method of forming anti-static layer on an exterior surface of polarizer was proposed, but the effect was not good enough, and could not prevent generation of static electricity basically. Therefore, the anti-static function is needed for the pressure sensitive adhesive to prevent generation of static electricity completely.

Conventional methods for providing the anti-static function of the pressure sensitive adhesive include a method of adding conductive components such as conductive metal powder or carbon particle, or a method of adding an ionic material such as a surfactant type. However, the method of adding metal powder or carbon particle had a disadvantage that transparency of the pressure sensitive adhesive layer is decreased since a large amount of metal powder or carbon particle should be used to provide the anti-static function. Also, the method of adding a surfactant had disadvantages that it is vulnerable to humidity, and adhesive property is decreased due to the migration of surfactant to a surface of the pressure sensitive adhesive.

Japanese Patent Publication No. 1993-140519 discloses a method for preventing generation of static electricity by adding plasticizer of ethyleneoxide-modified phtalic acid dioctyl in the pressure sensitive adhesive. However, the addition of such plasticizer only cannot prevent the fundamental generation of static electricity and not to eliminate static electricity remaining after the separation of releasing film, either.

Also, Japanese Patent Publication No. 1994-128539 discloses a method for providing anti-static property by mixing polyether polyol compounds and one or more alkali metal salts. However, this method has disadvantages that the use of polyether polyol compounds may affect the degree of crosslinking. To avoid such affection on the crosslinking degree, the inventors of the above patent tried to make crosslinking first by using isocyanate crosslinking agent, and then dissolved the composition again before mixing process of the polyether polyol compound and the alkali metallic salt. However, such processes are very difficult to be applied in real industry.

Therefore, it is required to develop a pressure sensitive adhesive having excellent antistatic property without changing compatibility and durability.

DISCLOSURE OF THE INVENTION

To solve the problems in the prior art explained above, one object of the present invention is to provide an acrylic pressure sensitive adhesive composition having improved anti-static property, which can prevent static electricity enough without change of the durability, transparency, and adhesion, and without whitening appearance under high temperature and humidity.

Another object of the present invention is to provide a polarizer and a liquid crystal display containing the above acrylic pressure sensitive adhesive composition having good anti-static property without change of the durability, transparency, and adhesion.

In order to achieve these objects, the present invention provides an acrylic pressure sensitive adhesive composition comprising:

a) 100 part by weight of acrylic copolymers;

b) 0.01 to 20 part by weight of ester plasticizer having at least one ether linkage in the molecular structure represented by the following formula (1):

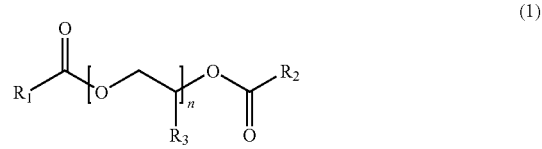

wherein, $R_1$ and $R_2$ are each independently alkyl group of 1~20 carbon atoms or aryl group, preferably alkyl group of 4~12 carbon atoms or aryl group of 6~12 carbon atoms such as phenyl or naphthyl, $R_3$ is hydrogen or methyl group, n is an integer of 2 to 20, preferably an integer of 2 to 17; and c) 0.001 to 25 part by weight of metal salts consisting of alkali metal cation, and anion which is counter-ion of super strong acid and has perfluoro alkyl group, represented by the following formula (2):

wherein,

M is alkali metal, preferably, lithium, sodium or potassium, $R_f$ is perfluoro alkyl group of 1~4 carbon atoms, Y is carbon or sulfur atom, X is nitrogen or carbon atom, m is 1 or 2, and n is 2 or 3, provided that when Y is carbon atom, m=1; when Y is sulfur, m=2; when X is nitrogen atom, n-2; and when X is carbon, n=3.

The present invention also provides a polarizer comprising the acrylic pressure sensitive adhesive composition on one side or both sides of a polarizing film as pressure sensitive adhesive layer.

The present invention further provides a liquid crystal display containing liquid crystal panel in which the above polarizer is adhered on one side or both sides of liquid crystal cell.

BEST MODE FOR CARRYING OUT THE INVENTION

Hereinafter, the present invention will be described in more detail.

The present inventor found out that the generation of static electricity can be fully prevented by applying both the ester plasticizer having at least one ether linkage in the molecular structure, and metal salts consisting of alkali metal cation and anion which is counter-ion of super strong acid and has perfluoro alkyl group, which have good compatibility with pressure sensitive adhesive, to the acrylic pressure sensitive adhesive at the same time, and completed the present invention.

The acrylic pressure sensitive adhesive composition according to the present invention is characterized in comprising a) 100 part by weight of acrylic copolymers; b) 0.01 to 20 part by weight of ester plasticizer having at least one ether linkage in the molecular structure represented by the formula (1); and c) 0.001 to 25 part by weight of metal salts consisting of alkali metal cation, and anion which is counter-ion of super strong acid and has perfluoro alkyl group, represented by the formula (2).

The above component a) used in the present invention may use the acrylic copolymers prepared by copolymerizing i) 90~99.9 wt % of (meth)acrylic acid ester monomers having alkyl group of 1~12 carbon atoms and ii) 0.1 to 10 wt % of vinyl monomers, and/or acrylic monomers having cross-linkable functional groups.

As the above (meth)acrylic acid ester monomers having alkyl group of 1~12 carbon atoms of the above i), there may be alkyl ester of 1~12 carbon atoms of acrylic acid (or methacrylic acid). In particular, when alkyl group of the alkyl (meth)acrylate is in the form of long chain, cohesion of the pressure sensitive adhesive drops. Thus, to maintain the cohesion under high temperature, it is preferable to use alkyl group of 2~8 carbon atoms.

Specifically, butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, or 2-ethylbutyl (meth)acrylate may be used alone or in mixture thereof.

In the present invention, copolymer monomer can be additionally included in the above acrylic copolymer to regulate the glass transition temperature of a pressure sensitive adhesive or to endow other functional properties thereto. For example, acrylonitrile, (meth)acrylamide, N-methyl acrylamide, styrene, methyl styrene, glycidyl(meth) acrylate, or vinyl acetate may be used.

The preferable content of the above (meth)acrylic acid ester monomers having alkyl group of 1~12 carbon atoms is 90 to 99 wt %. When the content is less than 90 wt %, the initial adhesive strength may be decreased. And, when the content is more than 99.9 wt %, the durability may be decreased due to the reduced cohesive strength.

The above vinyl monomers and/or acrylic monomers having cross-linkable functional groups in the above ii) react with crosslinking agent and play a role to provide adhesive strength and cohesive strength by chemical bond in order to prevent destruction of cohesive strength of the pressure sensitive adhesive under high temperature or humidity condition.

As the vinyl monomers and/or acrylic monomers having cross-linkable functional groups, it is preferable to use one or more selected from the group consisting of hydroxyalkyl (meth)acrylate, hydroxyalkyleneglycol(meth)acrylate, and/or ethylenically unsaturated monomer having one or more carboxlic acid. Particularly, monomer having hydroxy group, such as 2-hydroxyethyl (meth)acrylate, 2-hydroxypropyl (meth)acrylate, 2-hydroxyethyleneglycol(meth)acrylate, or 2-hydroxypropyl eneglycol(meth)acrylate; monomer having carboxylic group, such as acrylic acid, methacrylic acid, acrylic acid dimer, itaconic acid, maleic acid, or maleic anhydride may be used alone or in mixture thereof.

Among the acrylic copolymers, the preferable content of vinyl monomers and/or acrylic monomers having cross-linkable functional groups is 0.1 to 10 wt %. When the content is less than 0.1 wt %, the destruction of cohesive strength may be easily occurred under high temperature or humidity condition, and the effect of increasing the adhesive strength may be reduced. And, when the content is more than 10 wt %, the migration to the surface is remarkably generated due to the low compatibility, the flowability may be decreased, and the effect on reducing the stress may be dropped due to the high cohesive strength.

The acrylic copolymer of the present invention can be prepared by conventional methods such as solution polymerization, photo-polymerization, bulk polymerization, suspension polymerization, and emulsion polymerization, and particularly solution polymerization is preferable. Here, it is preferable to set the polymerization temperature between 50-140° C., and to mix an initiator after monomers are evenly mixed.

It is preferred to eliminate components generating bubbles such as volatile components, reaction residues, etc, from a pressure sensitive adhesive, before using. When elastic modulus of a pressure sensitive adhesive is too low, resulted from low crosslinking density or molecular weight, bubbles generated between glass substrate and pressure sensitive adhesive layer at high temperature are growing to form a scatter in inside of the pressure sensitive adhesive layer. Also, when a pressure sensitive adhesive with high elastic modulus is used for long time, edge lifting is observed at the end of pressure sensitive adhesive sheet due to the excessive crosslinking reaction.

The viscoelastic property of a pressure sensitive adhesive depends on molecular weight of polymer chain, molecular weight distribution, or abundant numbers of molecular structures, and in particular it might be determined by molecular weight. Thus, the preferable weight-average molecular weight of acrylic copolymer of the present invention is 800,000-2,000,000.

The ester plasticizer having at least one ether linkage in the molecular structure in the above b) forms complex by associating ether linkage in the molecular structure with metal salt consisting of alkali metal cation, and anion which is counter-ion of super strong acid and has perfluoro alkyl group, to provide ion-conductive property, and thus play a role to improve anti-static property. Also, the ester plasticizer has excellent compatibility and optical transparency.

The preferable ester plasticizer having at least one ether linkage in the molecular structure in the above is the compound represented by the formula (1). For example, diethylene glycol di-2-ethylhexonate, tetraethylene glycol di-2-ethylhexonate, polyethylene glycol di-2-ethylhexonate, triethylene glycol diethylbutylate, polyethylene glycol diethylbutylate, polypropylene glycol diethylhexonate, triethylene glycol dibenzonate, tetraethylene glycol dibenzonate, polyethylene glycol dibenzonate, polypropylene glycol dibenzonate, or polyethylene glycol-2-ethylhexonate benzonate may used alone or in mixture thereof.

The preferable content of ester plasticizer having at least one ether linkage in the molecular structure is 0.01 to 20 part by weight based on the 100 part by weight of the acrylic copolymers. When the content is less than 0.01 part by weight, the ester plasticizer cannot fully complex with alkali metal salts to decrease anti-static function. And, when the content is more than 20 part by weight, the durability may be decreased due to low cohesive property.

The metal salts consisting of alkali metal cation, and anion which is counter-ion of super strong acid and has perfluoro alkyl group in the above c) of the present invention form complex by associating with ether linkage of ester plasticizer, and thus play a role to improve anti-static property. Also, the above metal salts have law coordinate bonding capability with metal cation due to high electronegativity of fluorine atoms and the resonance structure of anion, excellent compatibility due to the high hydrophobicity, and good optical transparency under the high temperature and humidity. Single addition of the above alkali metallic salt itself to an acrylic adhesive can create antistatic effect. However, co-treatment of ester plasticizer having at least one ether linkages with the alkali metallic salt improves ionic conductivity remarkably as well as antistatic property greatly even though the small amount of them is used.

The preferable metal salts consisting of alkali metal cation, and anion which is counter-ion of super strong acid and has perfluoro alkyl group in the above is the compound represented by the formula (2). For example, as the anion, bistrifluoromethanesulfoneimide, bispentafluoroethanesulfoneimide, bispentafluoroethanecarbonylimide, bisperfluorobutanesulfoneimide, bisperfluorobutanecarbonylimide, tristrifluoromethanesulfonylmethide, or tristrifluoromethanecarbonylmethide may be used, and as for cation, lithium, sodium and potassium may used.

The preferable content of metal salts consisting of alkali metal cation, and anion which is counter-ion of super strong acid and has perfluoro alkyl group is 0.001 to 25 part by weight, more preferable 0.005 to 20 part by weight, most preferable 0.01 to 15 part by weight, based on the 100 part by weight of the acrylic copolymers. When the content is less than 0.001 part by weight, the alkali metal salts cannot fully complex with ether linkage of ester plasticizer to decrease anti-static function. And, when the content is more than 25 part by weight, the durability may be decreased due to the low cohesive strength, as well as the unit price may be increased.

The acrylic pressure sensitive adhesive composition of the present invention comprising the above components may further contain a crosslinking agent.

The above crosslinking agent has a function to increase cohesive strength of the pressure sensitive adhesive by reacting with carboxyl and hydroxy group.

The crosslinking agent can be selected from isocyanate, epoxy, aziridine, metal chelate crosslinking agents, etc, and particularly isocyanate crosslinking agent is preferred.

Specifically, the isocyanate crosslinking agent may include tolylene diisocyanate, xylene diisocyanate, diphenylmethane diisocyanate, hexamethylene diisocyanate, isoform diisocyanate, tetramethylxylene diisocyanate, naphthalene diisocyanate, or their reactants with polyol like trimethylolpropane.

The epoxy crosslinking agent may include ethyleneglycol diglycidylether, triglycidylether, trimethylolpropane triglycidylether, N,N,N'N'-tetraglycidylethylenediamine, or glycerine diglycidylether.

The aziridine crosslinking agent may include N,N'-toluene-2,4-bis(1-aziridinecarboxide), N,N'-diphenylmethane-4,4'-bis(1-aziridinecarboxide), triethylenemelamine, or tri-1-aziridinylphosphineoxide.

As metal chelate crosslinking agent, compounds prepared by coordinating multivalent metal such as Al, Fe, Zn, Sn, Ti, Sb, Mg, and V with acethylacetone or ethyl acetoacetate can be used.

In the mixing process to form the pressure sensitive adhesive layer, a crosslinking reaction of functional groups of a crosslinking agent should not be occurred for even coating. After the coating followed by dryness and aging, a crosslinking structure is formed, thereby obtaining a pressure sensitive adhesive layer having strong elasticity and cohesion. Here, by the strong cohesion of pressure sensitive adhesive, the pressure sensitive adhesive property such as stable durability of a pressure sensitive adhesive product and the cutting characteristic are enhanced.

The preferable content of crosslinking agent is 0.01 to 10 part by weight based on the 100 part by weight of the acrylic copolymers to improve cohesive strength, to prevent adhesive durability such as forming bubbles or inducing peeling, and to provide durability without edge lifting.

The pressure sensitive adhesive composition of the present invention, if necessary, may additionally include silane coupling agent or tackifier.

The above silane coupling agent plays a role to enhance thermal/moisture resistance by improving pressure sensitive adhesive stability on a glass substrate. Particularly, the silane coupling agent has a function to increase the stability of adhesive property when it is left for a long time under high temperature and high humidity.

The silane coupling agent may include γ-glycydoxypropyl trimethoxysilane, γ-glycydoxypropyl methyldiethoxysilane, γ-glycydoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane. These silane coupling agents can be used alone or in mixture thereof.

The preferable content of silane coupling agent is 0.005-5 part by weight based on 100 part by weight of an acrylic copolymer to improve adhesive stability and durability under high temperature and high humidity.

The above tackifier plays a role to regulate adhesive property. The tackifier may be (hydrogenated)hydrocarbon resin, (hydrogenated)rosin resin, (hydrogenated)rosinester resin, (hydrogenated)terpene resin, (hydrogenated)terpenephenol resin, polymerized rosin resin, and polymerized rosinester resin. These resins can be used can be used alone or in mixture thereof.

The preferable content of silane coupling agent is 1-100 part by weight based on 100 part by weight of an acrylic copolymer to improve compatibility and cohesive strength.

In addition, the acrylic pressure sensitive adhesive composition of the present invention, if necessary, may further include acrylic low molecular weight substances, epoxy resins, curing agent, UV stabilizers, antioxidants, coloring agents, reinforcing agents, fillers, antifoaming agents, surfactants, or plasticizer.

The present pressure sensitive adhesive composition comprising the above components may be prepared by a conventional preparation methods, specifically thermal curing or photo curing process is preferred.

The proper crosslinking density of the acrylic pressure sensitive adhesive composition of the present invention is 5~95%. When the crosslinking density of the pressure sensitive adhesive is less than 5%, the cohesion of the pressure sensitive adhesive is reduced and adhesive durability such as forming bubbles or inducing peeling. And when the crosslinking density is more than 95%, the stable durability such as edge lifting may be reduced.

The present invention further provides a polarizer containing the acrylic pressure sensitive adhesive composition as a pressure sensitive adhesive layer of a polarizing film. The polarizer of the present invention consists of a pressure sensitive adhesive layer formed from the pressure sensitive adhesive composition of the invention on one side or both sides of the polarizing film.

Polarizing film or polarizing device forming the above polarizer is not specifically limited. For example, the above polarizing film prepared by adding a polarizing component such as iodine or dichroic dye onto polyvinyl alcohol resin film and elongating it may be used. Also, there is no limitation in the thickness of polarizing film, and so the film may be made in conventional thickness. As a polyvinyl alcohol resin, polyvinyl alcohol, polyvinyl formal, polyvinyl acetal and ethylene, saponified vinyl acetate copolymer, etc. can be used.

On both sides of the polarizing film, multilayer films may be formed. The multilayer films are made by laminated protective films such as cellulose films like triacetyl cellulose, etc; polyester films like polycarbonate film, polyethylene terephthalate, etc; polyether sulphone films; polyolefin films having the structure of polyethylene or polypropylene, and polyolefine films having cyclo or norbornene structure, or ethylene propylene copolymer. The thickness of such protective films is not limited specifically, and conventional thickness may be accepted.

The method of forming the pressure sensitive adhesive layer on polarizing film is not limited. For example, the method may comprise the steps of coating the pressure sensitive adhesive directly on the surface of a polarizing film with Bar Coater and then drying it. Or, the method may comprise the steps of coating the pressure sensitive adhesive on the surface of releasing film followed by drying, and transferring the pressure sensitive adhesive layer onto the surface of polarizing film, followed by aging.

The polarizer of the present invention can include one or more additional layers providing supplementary functions, such as protective layer, reflecting layer, anti-glare film, phase retardation film, compensation film for wide view angle, and brightness enhancing film.

The polarizer using the pressure sensitive adhesive of the present invention can be applied to every LCD generally used now, and the kind of liquid crystal panel is not limited. Preferably, the present invention can construct LCD to include liquid crystal panel prepared by conjugating the pressure sensitive adhesive polarizer to one side or both sides of liquid crystal cell.

The acrylic pressure sensitive adhesive resin composition of the present invention can be widely used without limitation, such as for industrial sheet, particularly protective film, reflective sheet, structural pressure sensitive adhesive sheet, photographic pressure sensitive adhesive sheet, lane marking pressure sensitive adhesive sheet, optical pressure sensitive adhesive product, or pressure sensitive adhesive for electronic components. The pressure sensitive adhesive composition can also be applied to equivalent fields using same principles such as multi-layer laminate products like general industrial pressure sensitive adhesive sheet products, medical patches, or heat activated pressure sensitive pressure sensitive adhesives.

Preferred embodiments of the present invention are illustrated in the following Examples to help understanding on the present invention. However, it should be appreciated that those skilled in the art may make modifications and improvements within the spirit and scope of the present invention.

Example 1

Preparation of Acrylic Copolymers

A monomer mixture composed of 88.5 part by weight of n-butylacrylate (BA), 10.2 part by weight of ethylacrylate (EA), and 1.3 part by weight of hydroxyethylmethacrylate (2-HEMA) was put into a 1 L reactor equipped with the reflux of nitrogen gas and the cooling system for the regulation of temperature, to which 100 part by weight of ethyl acetate (EAc) was added as a solvent. To remove oxygen therefrom, nitrogen gas was purged for 1 hour, during which the temperature was kept at 62° C., and then 0.03 part by weight of azobisisobutyronitrile (AIBN) which was diluted by 50% in ethyl acetate was added thereto as a reaction initiator. The mixture was reacted for 8 hours, resulting in the acrylic copolymer.

[Mixing and Coating Process]

To 100 part by weight of the acrylic copolymer prepared above, 0.5 part by weight of tolylene diisocyanate adduct of trimethylolpropane (TDI-1), 7 part by weight of tetraethylene glycol dibenzonate (A-2) and 0.1 part by weight of polyethylene glycol(n=~11) di-2-ethylhexonate (A-3) as plasticizer, and 4.0 part by weight of lithium bistrifluoromethanesulfoneimide as metal salts were added. The mixture was diluted properly, homogeneously mixed, coated on a releasing film, and dried, to obtain an even pressure sensitive adhesive layer having the thickness of 25 micron.

[Laminating Process for Polarizer]

185 micron thick iodine polarizer was coated with the pressure sensitive adhesive layer prepared above.

Examples 2~4 and Comparative Examples 1~7

Except using the component and ratio as shown in Table 1, acrylic copolymers were prepared by the same method as described in Example 1. The unit of Table 1 is part by weight.

TABLE 1

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| acrylic co-polymers | n-BA | 88.5 | 92.7 | 96.6 | 88.5 | 92.7 | 92.7 | 96.6 | 96.6 | 88.5 | 88.5 | 88.5 |
| | EA | 10.2 | — | — | 10.2 | — | — | — | — | 10.2 | 10.2 | 10.2 |
| | MA | — | 3.0 | — | — | 3.0 | 3.0 | — | — | — | — | — |
| | AA | — | 4.1 | 3.4 | — | 4.1 | 4.1 | 3.4 | 3.4 | — | — | — |
| | 2-HEMA | 1.3 | 0.2 | — | 1.3 | 0.2 | 0.2 | — | — | 1.3 | 1.3 | 1.3 |
| crosslinking agent | | 0.5 | 0.5 | 0.5 | 0.5 | 0.5 | 0.5 | 0.5 | 0.5 | 0.5 | 0.5 | 0.5 |
| plasticizer | A-1 | — | 15.5 | — | 0.3 | 15.5 | — | — | — | — | — | — |
| | A-2 | 7.0 | — | — | — | — | — | 20.5 | — | 7.0 | — | — |
| | A-3 | 0.1 | — | 0.06 | — | — | — | 10.2 | 7.0 | 0.1 | — | 7.0 |
| metal salts | B-1 | 4.0 | 0.01 | 1.2 | — | — | 0.01 | — | 0.0006 | — | — | — |
| | B-2 | — | — | 10.8 | 10 | — | — | 1.0 | — | — | — | 30.0 |
| | B-3 | — | — | — | — | — | — | — | — | 4.0 | — | — | n-BA: n-butylacrylate
EA: ethylacrylate
MA: methylacrylate
AA: acrylic acid
2-HEMA: hydroxyethylmethacrylate
crosslinking agent: tolylene diisocyanate adduct of trimethylolpropane
A-1: tetraethylene glycol di-2-ethylhexonate
A-2: tetraethylene glycol dibenzonate
A-3: polyethylene glycol(n = ~11) di-2-ethylhexonate
B-1: lithium bistrifluoromethanesulfoneimide
B-2: lithium bistrifluoroethanesulfoneimide
B-3: lithium perchlorate Stable durability, surface resistance and haze of the polarizers prepared in Examples 1 to 4 and Comparative Examples 1 to 7 were examined by the following methods, and the results are shown in Table 2.

A. Durability

The polarizers (90 mm×170 mm) coated with the pressure sensitive adhesive prepared in Examples 1 to 4 and Comparative Examples 1 to 7 were attached onto both sides of a glass substrate (110 mm×190 mm×0.7 mm) on which optical absorption axes were crossed. Here, approximately 5 kg/cm² of pressure was given in a clean room to prevent generations of bubbles and impurities. Those test samples were left under a high temperature and high humidity (60° C., 90% relative humidity, and 1,000 hr). The test samples were left at room temperature for 24 hours right before the evaluation of the state of them, and then the generation of bubbles or edge lifting was observed. (Evaluation criteria: O; No bubbles or edge lifting was observed, Δ; A few bubbles or edge lifting was observed, and X; A large amount bubbles or edge lifting was observed)

B. Surface Resistance

After separating the releasing film from the polarizer prepared in Examples 1 to 4 and Comparative Examples 1 to 7, the surface resistance of the pressure sensitive adhesive was measured. Here, the surface resistance was measured after applying 500 V of electricity for 1 minute at 23° C., with 50% relative humidity. Here, when the measured surface resistance is more than $10^{13} \Omega/\square$, the pressure sensitive adhesive is not regarded as having the ant-static property.

C. Haze

The polarizers prepared in Examples 1 to 4 and Comparative Examples 1 to 7 were cut by 50 mm×80 mm, and the diffusion transmission rate (Td) and the total light transmission rate (Ti) were determined by using an integrated light transmission determining apparatus in accordance with ASTM D1003-95 and JIS K7150. Here, the haze value was defined by the percentage of Td for Ti. Those test samples were left at 60° C. of temperature and 90% relative humidity for 1,000 hr, and the haze values were determined by using the same method as the above. The whitening appearance was evaluated by comparing the haze values of those samples before and after the aging.

TABLE 2

| | | Durability | | Surface | Haze | |
|---|---|---|---|---|---|---|
| | | 80° C., 1000 hr | 60° C., 90% RH, 1000 hr | resistance ($\Omega/\square$) | Before aging | After aging |
| Examples | 1 | O | O | $2.0 \times 10^8$ | 0.1 | 0.1 |
| | 2 | O | O | $1.1 \times 10^{11}$ | 0.1 | 0.1 |
| | 3 | O | O | $4.3 \times 10^7$ | 0.1 | 0.1 |
| | 4 | O | O | $7.0 \times 10^{10}$ | 0.1 | 0.1 |
| Comparative | 1 | O | O | $4.0 \times 10^{14}$ | 0.1 | 0.1 |
| | 2 | O | O | $1.0 \times 10^{14}$ | 0.1 | 0.1 |
| | 3 | X | X | $1.0 \times 10^8$ | 0.1 | 0.1 |
| | 4 | O | O | $7.3 \times 10^{13}$ | 0.1 | 0.1 |
| | 5 | O | Δ | $9.7 \times 10^9$ | 0.1 | 25.3 |
| | 6 | O | O | $4.0 \times 10^{14}$ | 0.1 | 0.1 |
| | 7 | X | X | $1.0 \times 10^7$ | 0.1 | 1.0 |

As shown in Table 2, the adhesives using the present metal salts represented by formula (2) of Example 1 to 4 show good optical transparent, excellent durability and anti-static property under the high temperature and humidity, compared with those of Comparative Examples 1 to 7.

Those killed in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

The acrylic pressure sensitive adhesive composition, polarizer, and LCD having the above composition of the present invention have improved anti-static properties which can prevent whitening of appearance under high temperature and humidity condition as well as static electricity without change of the durability, transparency, and adhesion.

The invention claimed is:

1. Acrylic pressure sensitive adhesive composition comprising:
   a) 100 part by weight of acrylic copolymers;
   b) 0.01 to 20 part by weight of ester plasticizer having at least one ether linkage in the molecular structure represented by the following formula (1):

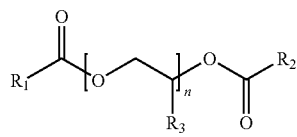

wherein, $R_1$ and $R_2$ are each independently alkyl group of 4 to 12 carbon atoms or aryl group of 6 to 12 carbon atoms, $R_3$ is hydrogen or methyl group, n is an integer of 4 to 11; and
   c) 0.01 to 12 part by weight of metal salts consisting of alkali metal cation, and anion which is counter-ion of super strong acid and has perfluoro alkyl group represented by the following formula (2):

$$M^+[X(YO_mR_f)_n]^-  \quad (2)$$

wherein, the metal salts have one or more anions selected from the group consisting of bistrifluoromethanesulfoneimide, bispentafluoroethanesulfoneimide, and bisperfluorobutanesulfoneimide, and one or more cations selected from the group consisting of lithium, sodium, and potassium,
   wherein the ester plasticizer having at least one ether linkage forms a complex with the metal salts.

2. The acrylic pressure sensitive adhesive composition of claim 1, wherein the acrylic copolymers in the above a) are prepared by copolymerizing, i) 90 to 99.9 wt % of (meth)acrylic acid ester monomers having alkyl group of 1 to 12 carbon atoms, and ii) 0.1 to 10 wt % of vinyl monomers and/or acrylic monomers having cross-linkable functional groups.

3. The acrylic pressure sensitive adhesive composition of claim 2, wherein the (meth)acrylic acid ester monomers having alkyl group of 1 to 12 carbon atoms in the above i) are one or more selected from the group consisting of butyl(meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, and 2-ethylbutyl (meth)acrylate.

4. The acrylic pressure sensitive adhesive composition of claim 2, wherein the (meth)acrylic acid ester monomers having alkyl group of 1 to 12 carbon atoms in the above i) are mixed with one or more co-monomers selected from the group consisting of acrylonitrile, (meth)acrylamide, N-methyl acrylamide, styrene, methyl styrene, glycidyl(meth)acrylate, and vinyl acetate.

5. The acrylic pressure sensitive adhesive composition of claim 2, wherein the vinyl monomers and/or acrylic monomers having cross-linkable functional groups in the above ii) are one or more selected from the group consisting of 2-hydroxyethyl (meth)acrylate, 2-hydroxypropyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid, and maleic anhydride.

6. The acrylic pressure sensitive adhesive composition of claim 1, wherein the weight-average molecular weight of the acrylic copolymers in the above a) is 800,000 to 2,000,000.

7. The acrylic pressure sensitive adhesive composition of claim 1, wherein the ester plasticizer having at least one ether linkage in the molecular structure in the above b) is one or more selected from the group consisting of tetraethylene glycol di-2-ethylhexonate, polyethylene glycol di-2-ethylhexonate (n=5-11), polyethylene glycol diethylbutylate (n=5-11), polypropylene glycol diethylhexonate (n=5-11), tetraethylene glycol dibenzonate, polyethylene glycol dibenzonate (n=5-11), polypropylene glycol dibenzonate (n=5-11), and polyethylene glycol-2-ethylhexonate benzonate (n=5-11).

8. The acrylic pressure sensitive adhesive composition of claim 1, wherein the composition comprises 0.01 to 10 part by weight of multifunctional crosslinking agent based on 100 part by weight of acrylic copolymers.

9. The acrylic pressure sensitive adhesive composition of claim 8, wherein the multifunctional crosslinking agent is isocyanate compound.

10. The acrylic pressure sensitive adhesive composition of claim 1, wherein the composition further comprises one or more additives selected from the group consisting of silane coupling agent, tackifier, acrylic low molecular weight substances, epoxy resins, curing agent, UV stabilizers, antioxidants, coloring agents, reinforcing agents, fillers, antifoaming agents, surfactants, and plasticizer.

11. The acrylic pressure sensitive adhesive composition of claim 1, wherein the crosslinking density of the acrylic pressure sensitive adhesive composition is 5 to 95%.

12. The acrylic pressure sensitive adhesive composition of claim 1, wherein the composition is applied to protective film, reflective sheet, structural pressure sensitive adhesive sheet, photographic pressure sensitive adhesive sheet, lane marking pressure sensitive adhesive sheet, optical pressure sensitive adhesive product, pressure sensitive adhesive for electronic components and other industrial sheets, multi-layer laminate products, general industrial pressure sensitive adhesive sheet products, medical patches, or heat activated pressure sensitive pressure sensitive adhesives.

13. A polarizer comprising the acrylic pressure sensitive adhesive composition of any one of claims 1 to 7 and 8 to 12 on one side or both sides of polarizing film as pressure sensitive adhesive layer.

14. The polarizer of claim 13, wherein the polarizer further comprises one or more layers selected from the group consisting of protective layer, reflecting layer, anti-glare film, phase retardation plate, compensation film for wide view angle, and brightness enhancing film.

15. A liquid crystal display comprising liquid crystal panel in which a polarizer of claim 13 is adhered onto one side or both sides of liquid crystal cell.

* * * * *